United States Patent
Dow et al.

(10) Patent No.: US 11,074,319 B2
(45) Date of Patent: Jul. 27, 2021

(54) AUGMENTING MODEL-TO-MODEL COUPLING WITH HIGH-FREQUENCY OBSERVATIONS

(71) Applicant: International Business Machines Corporation, Armonk, NY (US)

(72) Inventors: Eli Michael Dow, Wappingers Falls, NY (US); Campbell D. Watson, Brooklyn, NY (US); Guillaume A. R. Auger, White Plains, NY (US); Michael E. Henderson, South Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 214 days.

(21) Appl. No.: 16/295,152

(22) Filed: Mar. 7, 2019

(65) Prior Publication Data
US 2020/0285688 A1  Sep. 10, 2020

(51) Int. Cl.
*G06F 17/17*   (2006.01)
*G06N 7/00*    (2006.01)

(52) U.S. Cl.
CPC ............ *G06F 17/175* (2013.01); *G06N 7/00* (2013.01)

(58) Field of Classification Search
CPC .................................................. G06F 17/175
See application file for complete search history.

(56) References Cited

U.S. PATENT DOCUMENTS

| | | | | |
|---|---|---|---|---|
| 2004/0044715 | A1* | 3/2004 | Aldroubi | ........... G06T 5/10 708/490 |
| 2004/0243657 | A1* | 12/2004 | Goren | ........... G06T 1/0007 708/607 |
| 2009/0192769 | A1* | 7/2009 | Dangui | ........... G02B 6/02323 703/2 |
| 2013/0231906 | A1 | 9/2013 | Luvalle | |

FOREIGN PATENT DOCUMENTS

CN   102314554 A   1/2012

OTHER PUBLICATIONS

Berner et al., "Stochastic Parameterization: Toward a New View of Weather and Climate Models", American Meteorological Society, Mar. 2017, pp. 565-588.
(Continued)

*Primary Examiner* — Michael D. Yaary
(74) *Attorney, Agent, or Firm* — Cantor Colburn LLP; Joseph Petrokaitis

(57) ABSTRACT

A system and method to augment model-to-model coupling include obtaining an output signal fs from an upstream model. The method also includes obtaining an observation signal $g_{ob}$ from a region of interest, extracting a high-frequency signal g from the observation signal $g_{ob}$ using a linear operator, and providing to a downstream model the high-frequency signal g in addition to information based on the output signal fs from the upstream model. The downstream model is implemented to obtain a prediction or estimation of one or more parameters of interest or drive a mechanical process.

20 Claims, 2 Drawing Sheets

(56) References Cited

OTHER PUBLICATIONS

English Translation of KR101822395 B1, Published Jan. 26, 2018, pp. 1-28.
Hipsey et al., A General Lake Model (GLM 24) for linking with high-frequency sensor data from the Global Lake Ecological Observatory Network (GLEON), Geosci. Model Dev. Discuss, Nov. 20, 2017, pp. 1-60.
Judt et al., "Using Stochastic Kinetic Backscatter Scheme (SKEBS) Ensembles to Better Understand Hurricane Predictability," HFIP (Hurricane Forecast Improvement Program, NOAA) Annual Review Meeting, Nov. 17-20, 2015, pp. 1-17.
Pena et al., "Separating fast and slow modes in coupled chaotic systems", Nonlinear Processes in Geophysics, 2004, pp. 319-327.
Tian et al., "Air-sea fluxes in a climate model using hourly coupling between the atmospheric and the oceanic components", Clim Dyn, 2017, pp. 1-18.
Toth et al., "Ensemble Forecasting at NMC: The Generation of Perturbations", Bulletin of the American Meteorological Society, vol. 74, No. 12, 1993, pp. 2317-2330.

\* cited by examiner

AUGMENTING MODEL-TO-MODEL COUPLING WITH HIGH-FREQUENCY OBSERVATIONS

BACKGROUND

The present invention relates in general to computer-generated models of physical systems, and more specifically, to augmenting model-to-model coupling with high-frequency observations.

In a one-way coupled-model scenario, the output of one model, which can be referred to as the upstream model, is provided as an input to another model, which can be referred to as a downstream model. The upstream and downstream models can be numerical models of physical systems (e.g., weather forecast model, lake circulation model, cell growth model, traffic congestion model). The time interval at which output is provided by the upstream model typically does not match the time interval at which the downstream model operates. A previous approach has involved linearly interpolating the output of the upstream model to match the time interval needed by the downstream model. The linear interpolation removes high-frequency variations in the upstream model output that may convey important information to the downstream model.

SUMMARY

Embodiments of the present invention are directed to systems and methods to augment model-to-model coupling. The method includes obtaining an output signal fs from an upstream model, obtaining an observation signal $g_{ob}$ from a region of interest, and extracting a high-frequency signal g from the observation signal $g_{ob}$ using a linear operator. The method also includes providing to a downstream model the high-frequency signal g in addition to information based on the output signal fs from the upstream model. The downstream model is implemented to obtain a prediction or estimation of one or more parameters of interest or drive a mechanical process.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, one-way coupled-models involve an upstream model providing input to a downstream model. The (temporal) resolution at which the upstream model provides output can be coarser than needed by the downstream model. In other cases, even when the internal temporal resolution of the upstream model resolution is sufficient to drive a downstream model, the output time frequency of the upstream model can be constrained because of excessive data volumes generated by the upstream model or the computation time required by the downstream model to take in all the data. Consequently, there can be a mismatch between the time interval of output provided by an upstream model and the time interval needed as input by a downstream model. Linearly interpolating the output of the upstream model to match the typically smaller time interval needed by the downstream model can result in high-frequency variations in in internal computations of the upstream model being removed from the input to the downstream model.

One or more embodiments of the invention detailed herein relate to programmable computers configured to augment model-to-model coupling with high-frequency observations. Specifically, observations are obtained in a region of interest. A high-frequency signal is extracted from the observations using a projection matrix. This high-frequency signal is added to interpolated output of the upstream model. The high-frequency signal can be thought to correct the interpolated output by introducing small-scale dynamics and high-frequency modes into the interpolated signal. The upstream model, the downstream model, and the observations can relate to a number of areas. For example, in economic modeling, high-frequency observations of customers can augment the output of the upstream model. In reservoir modeling, the high-frequency observations can relate to chemical species or throughflow. In epidemiology, a camera can be used on a cell growth model to obtain high-frequency observations of cell division or replication. In traffic models, the high-frequency signals can be obtained from sensors recording traffic information. Other exemplary areas that can benefit from high-frequency observations augmenting model-to-model coupling include weather, hydrology, ocean or lake modeling, agriculture, or energy.

Figure 1:
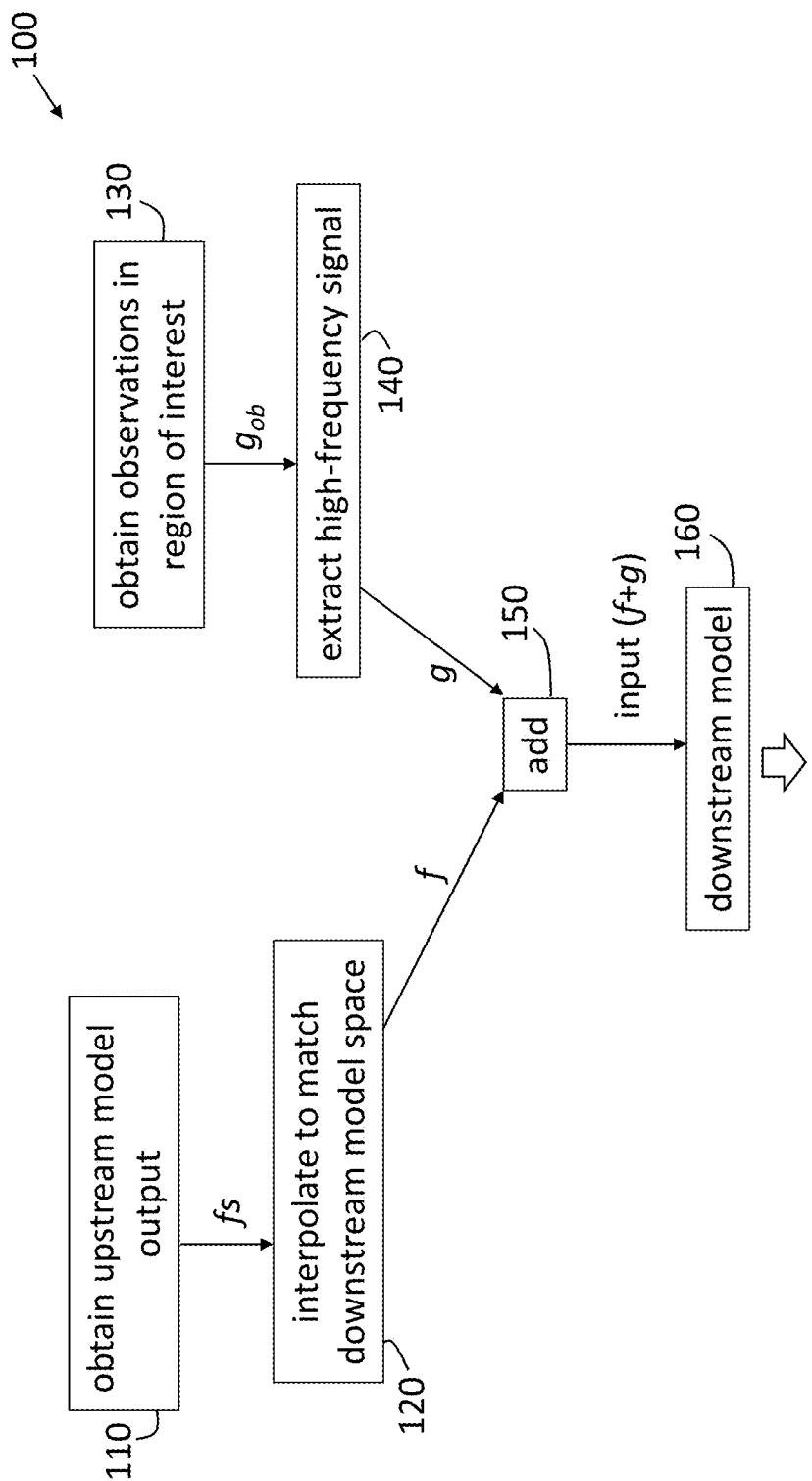
FIG. 1 is a process flow of a method of augmenting model-to-model coupling with high-frequency observations according to one or more embodiments of the invention.
Figure 2:
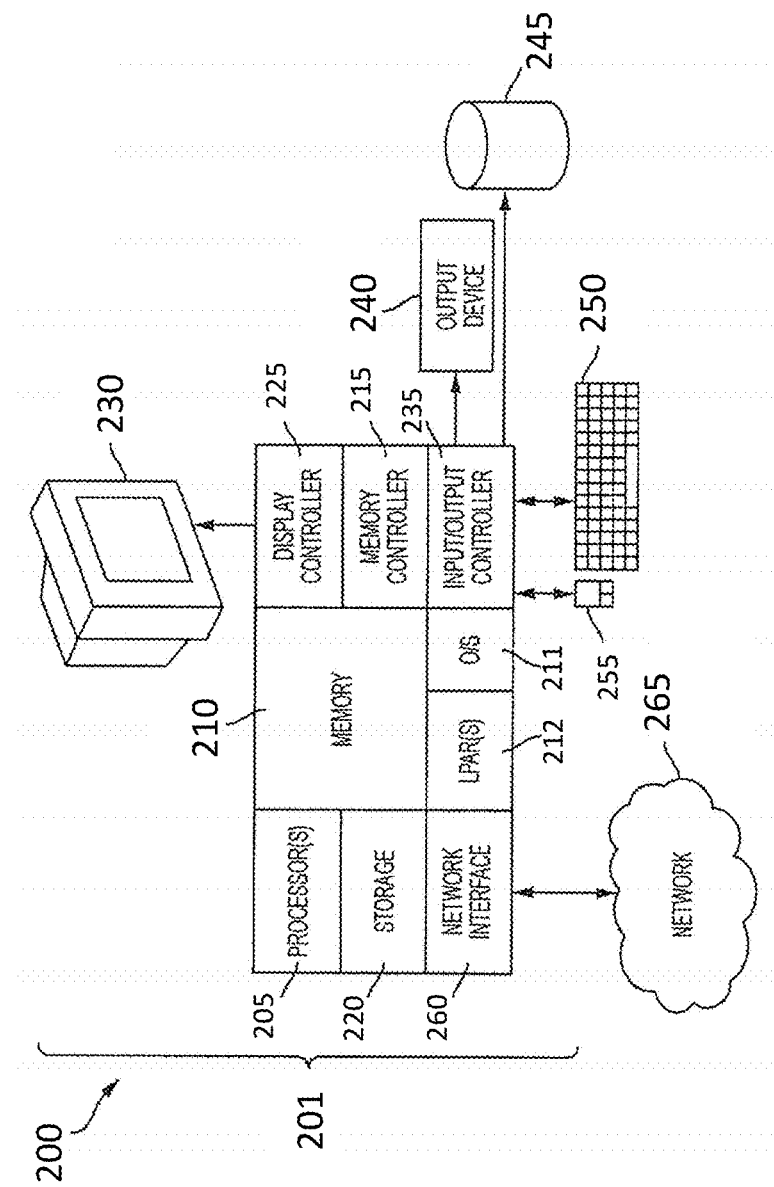
FIG. 2 is a block diagram of a computer system for augmenting model-to-model coupling with high-frequency observations in accordance with one or more embodiments of the invention.

FIG. 1 depicts a flow diagram illustrating a method 100 of augmenting model-to-model coupling with high-frequency observations according to one or more embodiments of the invention. FIG. 2 shows a computer system 200 configured and arranged to implement the method 100 of augmenting model-to-model coupling with high-frequency observations in accordance with one or more embodiments of the invention. The method 100 can be implemented by the computing system 200 using, for example, hardware, software (e.g., firmware), or a combination thereof. In an exemplary embodiment of the invention, the method 100 is implemented in hardware as part of the microprocessor of a special or general-purpose digital computer, such as a personal computer, workstation, minicomputer, or mainframe computer.

Referring now to FIG. 1, at block 110, the system 100 (shown in FIG. 1) obtains upstream model outputs by, for example, obtaining the output signal fs. Inputs for the upstream model can include sensor measurements or outputs from other models. Each value of fs can correspond with a position (e.g., (x, y, z)=latitude, longitude, and elevation) as well as with a particular time t. That is, each fs can be represented as fs(x, y, z, t). The set of all values of a vector, such as fs, can be referred to as a space. The space of the signal fs, which is output by the upstream model, is assumed to be slower or sparser than the space of input signal needed by the downstream model. For example, the intervals $t_{up}$ (i.e., time steps) at which values offs are output can be less frequent than the intervals $t_{down}$ at which the downstream model operates. As another example, the two-dimensional positions (x, y) in the space of the signal fs can be sparser than required by the downstream signal. As yet another example, all four dimensions (x, y, z, t) of the signal fs can be slower or sparser than required by the downstream model.

At block 120, interpolating to match the downstream model space can refer to interpolating fs in one or more of the dimensions x, y, z, and t. The upstream model output signal fs which is at intervals $t_{up}$, can be interpolated linearly to obtain interpolated signal f which is at intervals $t_{down}$. For example, the upstream model output signal fs at four time values [fs(t0), fs(t1), fs(t2), fs(t3)] can be interpolated to seven time values to obtain the interpolated signal f as [fs(t0), (fs(t0)+fs(t1))/2, fs(t1), (fs(t1)+fs(t2))/2, fs(t2), (fs(t2)+fs(t3))/2, fs(t3)]. According to the example, in only the time dimension, one point needs to be added between each adjacent set of points in fs to obtain the interpolated signal f. For x and y, four point need to be added, for x, y, and z, eight points need to be added, and for x, y, z, and t, sixteen points need to be added.

At block 130, obtaining observations in the region of interest results in an observation signal $g_{ob}$. Like the upstream model output signal fs, each value of $g_{ob}$ can correspond with a position (e.g., (x, y, z)=latitude, longitude, and elevation) as well as with a particular time t. In an exemplary case, if the upstream model is a weather model and the downstream model is a lake circulation model, the observations can be temperature, wind velocity, and humidity observations at the lake. Variations that occur in the weather at higher frequency time scales (e.g., turbulence, katabatic flow, and air flow swashing) are likely to be omitted when the upstream model output signal fs is linearly interpolated (at block 120). The inclusion of observations (at block 130) can ensure the inclusion of some statistics about small-scale dynamics or high-frequency modes.

At block 140, extracting a high-frequency signal g from the observations $g_{ob}$ is based on a projection matrix Q. Specifically:

$$g=(1-Q)g_{ob} \quad [EQ. 1]$$

The projection matrix Q is further discussed below. At block 150, adding the interpolated signal f from the upstream model and the high-frequency signal g from the observations results in the input to the downstream model at block 160. This input is used by the downstream model, at block 160, to provide its own output. Although one upstream model providing input to one downstream model is shown according to an exemplary embodiment of the invention, more than two models can be coupled according to alternate or additional embodiments of the invention. For example, the output of the downstream model, as it is or interpolated and added to high-frequency observations, can be provided as input to another model even further downstream.

The projection matrix Q in EQ. 1 is given by:

$$Q=\Phi(\Phi^T\Phi)^{-1}\Phi^T \quad [EQ. 2]$$

In EQ. 2, the matrix $\Phi$ has columns that are the basis for a subspace, and the projection matrix Q is the projection of a vector onto that subspace. As previously noted, a space refers to the set of all values that a vector can take. A subspace is a set of points defined by a combination of a set of less than N independent vectors. A set of N vectors called a basis is used to represent a space. A basis is not unique and the space can be represented by a number of bases (e.g., wavelets, Fourier transforms). One exemplary set of N vectors that form a basis is given by:

$$\hat{e}_0 = \begin{bmatrix} 1 \\ 0 \\ 0 \\ \vdots \\ 0 \end{bmatrix}, \hat{e}_1 = \begin{bmatrix} 0 \\ 1 \\ 0 \\ \vdots \\ 0 \end{bmatrix}, \hat{e}_2 = \begin{bmatrix} 0 \\ 0 \\ 1 \\ \vdots \\ 0 \end{bmatrix}, \ldots \hat{e}_{N-1} = \begin{bmatrix} 0 \\ 0 \\ 0 \\ \vdots \\ 1 \end{bmatrix}$$

Then any vector in the space can be written using the basis. For example:

$$\begin{bmatrix} f_0 \\ f_1 \\ f_2 \\ \vdots \\ f_{N-1} \end{bmatrix} = f_0\hat{e}_0 + f_1\hat{e}_1 + f_2\hat{e}_2 + \ldots + f_{N-1}\hat{e}_{N-1}$$

vector v in the subspace defined by basis vectors $\varphi$ can be written as:

$$v=v_0\varphi_0+v_1\varphi_1+v_2\varphi_2+\ldots,+v_{M-1}\varphi_{M-1} \quad [EQ. 3]$$

The projection of vector v onto another vector w is given in terms of a dot product as:

$$v^Tw \stackrel{def}{=} v \cdot w = v_0w_0+v_1w_1+v_2w_2+\ldots, v_{N-1}w_{N-1} \quad [EQ. 4]$$

The projection of v onto w can then be written as:

$$w\frac{1}{(w \cdot w)}(w \cdot v) \quad [EQ. 5]$$

As previously noted, the matrix $\Phi$ has columns that are the basis for a subspace. The matrix $\Phi$ can be represented as:

$$\Phi=[\varphi_0,\varphi_1,\ldots\varphi_{M-1}] \quad [EQ. 6]$$

Each column of the matrix $\Phi$ is one of the basis vectors $\varphi$. Then, the projection Q of the vector v into the subspace is given by:

$$Qv=\Phi(\Phi^T\Phi)^{-1}\Phi^Tv \quad [EQ. 6]$$

For the projection Q, $Q=Q^T$ the transpose of projection Q, and QQ=Q.

The matrix $\Phi$ results from an interpolation into the downstream model space of a basis of vectors for the space of the upstream model output signal fs (i.e., a slower or sparser space than the space needed for input to the downstream model). That is, the basis $\Psi$ of vectors for the space of the upstream model output signal fs is given by:

$$\Psi=[\psi_0,\psi_1,\ldots\psi_{M-1}] \quad [EQ. 7]$$

Interpolation of the basis $\Psi$ results in the matrix $\Phi$. As an example, for the previously discussed case of interpolating four points in the space of the upstream model output fs to obtain seven points in the space of the downstream model:

$$\Psi = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \xrightarrow{interpolate} \Phi = \begin{bmatrix} 1 & 0 & 0 & 0 \\ .5 & .5 & 0 & 0 \\ 0 & 1 & 0 & 0 \\ 0 & .5 & .5 & 0 \\ 0 & 0 & 1 & 0 \\ 0 & 0 & .5 & .5 \\ 0 & 0 & 0 & 1 \end{bmatrix} \quad [EQ. 8]$$

To summarize the process of obtaining the high-frequency signal g at block 140, a (non-unique) basis $\Psi$ for the space of the upstream model is constructed first. This is interpolated to obtain the matrix $\Phi$. From the matrix $\Phi$, the projection Q is obtaining using EQ. 2. Then, EQ. 1 is used to obtain the high-frequency signal g. The input to the downstream model is the sum of interpolated signal f and the high-frequency signal g. By using the basis vectors, different operations are not performed based on whether the signals are a function of x, y, z, and t or only a subset of x, y, z, and t. As indicated in FIG. 1, the output of the downstream model can be a prediction or estimate of one or more parameters of interest. Additionally or alternately, the output of the downstream model can drive a mechanical process. These are further discussed.

An exemplary upstream model for atmospheric fluid dynamics outputs a weather forecast. The upstream model can obtain input from sensors that measure barometric pressure, air temperature, topographical information, land use data, and solar radiation data. The upstream model can also obtain input from alternative numerical weather prediction models. Those numerical weather prediction models can provide geographically annotated air temperature, wind speeds, cloud cover, and air quality information (e.g., forecasted particulate counts). The observation signal $g_{ob}$ can indicate wind speed according to one exemplary embodiment of the invention or precipitation according to another exemplary embodiment of the invention. The high frequency signal g obtained from the observation signal $g_{ob}$ is projected onto the interpolated output of the downstream model according to one or more embodiments of the invention, as previously detailed. This input is provided to a downstream model (block 160, FIG. 1). An exemplary downstream model can be a hydrologic model that acts as a simplification of a real-world system (e.g., surface water, soil water, wetland, groundwater, estuary) and facilitates predicting and managing water resources. The downstream model can be used to track precipitation runoff into soils or channelization of the runoff into streams or tributaries.

Similarly, in other areas (e.g., cell growth, traffic congestion), augmenting of model-to-model coupling with high-frequency observations is facilitated by one or more embodiments of the invention. As the previous example indicates, the downstream model may provide a prediction or estimate of one or more parameters of interest. The prediction or estimation can be provided as an input to a further downstream model. Additionally or alternately, the downstream model can drive a mechanical process. For example, based on the output of the downstream model indicating a particular level of toxicity, flow rate, or other parameter, an intake valve can be opened or closed according to a pre-defined process. In the above-discussed example with the downstream model being a hydrologic model, the indication of runoff into streams can be used to operate (e.g., open or close) a dam gate, as needed.

Turning now to FIG. 2, as previously noted herein, the computer system 200 is configured to implement the method 100 (shown in FIG. 1) for augmenting model-to-model coupling with high-frequency observations in accordance with one or more embodiments of the invention. The system 200 can include general-purpose computer or mainframe 201 capable of running multiple instances of an O/S simultaneously.

In an exemplary embodiment of the invention, in terms of hardware architecture, as shown in FIG. 2, the computer 201 includes one or more processors 205, memory 210 coupled to a memory controller 215, and one or more input and/or output (I/O) devices 240, 245 (or peripherals) that are communicatively coupled via a local input/output controller 235. The input/output controller 235 can be, for example but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 235 may include a plurality of sub-channels configured to access the output devices 240 and 245. The sub-channels may include fiber-optic communications ports.

The processor 205 is a hardware device for executing software, particularly that stored in storage 220, such as cache storage, or memory 210. The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing instructions.

The memory 210 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The instructions in memory 210 may include one or more separate programs, each of which comprises an ordered listing of executable instructions for implementing logical functions. In the example of FIG. 2, the instructions in the memory 210 a suitable operating system (OS) 211. The operating system 211 essentially controls the execution of other computer programs and provides scheduling, input-output control, file and data management, memory management, and communication control and related services.

The memory 210 may include multiple logical partitions (LPARs) 212, each running an instance of an operating system. The LPARs 212 may be managed by a hypervisor, which may be a program stored in memory 210 and executed by the processor 205.

In an exemplary embodiment, a conventional keyboard 250 and mouse 255 can be coupled to the input/output controller 235. Other output devices such as the I/O devices 240, 245 may include input devices, for example but not limited to a printer, a scanner, microphone, and the like. Finally, the I/O devices 240, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 200 can further include a display controller 225 coupled to a display 230. In an exemplary embodiment, the system 200 can further include a network interface 260 for coupling to a network 265. The network 265 can be an IP-based network for communication between the computer

201 and any external server, client and the like via a broadband connection. The network 265 transmits and receives data between the computer 201 and external systems. In an exemplary embodiment, network 265 can be a managed IP network administered by a service provider. The network 265 may be implemented in a wireless fashion, e.g., using wireless protocols and technologies, such as WiFi, WiMax, etc. The network 265 can also be a packet-switched network such as a local area network, wide area network, metropolitan area network, Internet network, or other similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstation, intelligent device or the like, the instructions in the memory 210 may further include a basic input output system (BIOS) (omitted for simplicity). The BIOS is a set of essential software routines that initialize and test hardware at startup, start the OS 211, and support the transfer of data among the hardware devices. The BIOS is stored in ROM so that the BIOS can be executed when the computer 201 is activated.

When the computer 201 is in operation, the processor 205 is configured to execute instructions stored within the memory 210, to communicate data to and from the memory 210, and to generally control operations of the computer 201 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of augmenting model-to-model coupling, the computer-implemented method comprising:
    obtaining an output signal fs from an upstream model;
    obtaining an observation signal $g_{ob}$ from a region of interest;
    extracting, using a processor, a high-frequency signal g from the observation signal $g_{ob}$ using a linear operator, wherein the high-frequency signal g has a higher frequency time scale than the output signal fs;
    obtaining an interpolated signal f from the output signal fs, wherein the interpolated signal f is at the higher frequency time scale of the high-frequency signal g;
    providing to a downstream model the high-frequency signal g and the interpolated signal f that is based on the output signal fs from the upstream model, wherein the high-frequency signal g augments the interpolated signal f based on high-frequency variations in the upstream model that are omitted in the interpolated signal f; and
    implementing the downstream model to obtain a prediction or estimation of one or more parameters of interest or drive a mechanical process.

2. The computer-implemented method according to claim 1, wherein the obtaining the output signal fs is as a function of three-dimensional position x, y, z, and time t.

3. The computer-implemented method according to claim 2, further comprising performing linear interpolation of the output signal fs to obtain the interpolated signal f.

4. The computer-implemented method according to claim 3, wherein the interpolating the output signal fs is in two or more of the three-dimensional position x, y, z, and time t.

5. The computer-implemented method according to claim 1, wherein the extracting the high-frequency signal g is based on using a projection Q as $(1-Q)g_{ob}$.

6. The computer-implemented method according to claim 5, further comprising constructing the projection Q as:

$$Q = \Phi(\Phi^T\Phi)^{-1}\Phi^T, \text{ wherein}$$

$\Phi$ comprises a matrix of basis vectors such that the basis vectors are a non-unique representation of all values of a vector, referred to as a space, and the space is the space of the downstream model.

7. The computer-implemented method according to claim 6 further comprising obtaining the matrix $\Phi$ by interpolating a second basis for a second space, wherein the second space is the space of the upstream model.

8. A system to augment model-to-model coupling, the system comprising:
    a memory device configured to store an upstream model and a downstream model, wherein the upstream model provides input for the downstream model; and
    a processor configured to obtain an output signal fs from the upstream model, to obtain an observation signal $g_{ob}$ from a region of interest, to extract a high-frequency signal g from the observation signal $g_{ob}$ using a linear operator, wherein the high-frequency signal g has a higher frequency time scale than the output signal fs, to obtain an interpolated signal f from the output signal fs, wherein the interpolated signal f is at the higher frequency time scale of the high-frequency signal g, and to provide the high-frequency signal g and the interpolated signal f that is based on the output signal fs from the upstream model to the downstream model, wherein the high-frequency signal g augments the interpolated signal f based on high-frequency variations in the upstream model that are omitted in the interpolated signal f, and the downstream model provides a prediction or an estimation of one or more parameters of interest or drives a mechanical process.

9. The system according to claim 1, wherein the processor is configured to obtain the output signal fs as a function of time t and three-dimensional positions x, y, z.

10. The system according to claim 9, wherein the processor is further configured to perform linear interpolation of the output signal fs to obtain the interpolated signal f.

11. The system according to claim 10, wherein the processor is configured to interpolate the output signal fs in two or more of time t and the three-dimensional position x, y, z.

12. The system according to claim 8, wherein the processor is configured to extract the high-frequency signal g based on using a projection Q as $(1-Q)g_{ob}$.

13. The system according to claim 12, wherein the processor is further configured to construct the projection Q as:

$$Q = \Phi(\Phi^T\Phi)^{-1}\Phi^T, \text{ wherein}$$

$\Phi$ comprises a matrix of basis vectors such that the basis vectors are a non-unique representation of all values of a vector, referred to as a space, and the space is the space of the downstream model.

14. The system according to claim 13, wherein the processor is further configured to obtain the matrix $\Phi$ by interpolating a second basis for a second space, wherein the second space is the space of the upstream model.

15. A computer program product for augmenting model-to-model coupling, the computer program product comprising a computer readable storage medium having program instructions embodied therewith, the program instructions executable by a processor to perform a method comprising:
  obtaining an output signal fs from an upstream model;
  obtaining an observation signal $g_{ob}$ from a region of interest;
  extracting a high-frequency signal g from the observation signal $g_{ob}$ using a linear operator, wherein the high-frequency signal g has a higher frequency time scale than the output signal fs; and
  obtaining an interpolated signal f from the output signal fs, wherein the interpolated signal f is at the higher frequency time scale of the high-frequency signal g;
  providing to a downstream model the high-frequency signal g and the interpolated signal f that is based on the output signal fs from the upstream model, wherein the high-frequency signal g augments the interpolated signal f based on high-frequency variations in the upstream model that are omitted in the interpolated signal f, and the downstream model provides a prediction or an estimation of one or more parameters of interest or drives a mechanical process.

16. The computer program product according to claim 15, wherein the obtaining the output signal fs is as a function of time t and three-dimensional position x, y, z.

17. The computer program product according to claim 16, further comprising performing linear interpolation of the output signal fs to obtain the interpolated signal f, wherein the interpolating the output signal fs is in two or more of the time t and the three-dimensional position x, y, z.

18. The computer program product according to claim 15, wherein the extracting the high-frequency signal g is based on using a projection Q as $(1-Q)g_{ob}$.

19. The computer program product according to claim 18, further comprising constructing the projection Q as:

$$Q = \Phi(\Phi^T\Phi)^{-1}\Phi^T, \text{ wherein}$$

$\Phi$ is a matrix of basis vectors such that the basis vectors are a non-unique representation of all values of a vector, referred to as a space, and the space is the space of the downstream model.

20. The computer program product according to claim 19, further comprising obtaining the matrix $\Phi$ by interpolating a second basis for a second space, wherein the second space is the space of the upstream model.

* * * * *